Nov. 11, 1958 F. J. HERLEHY Re. 24,564

RAILROAD TRACK LINING MACHINE

Original Filed Jan. 10, 1952 3 Sheets-Sheet 1

Inventor
Frank J. Herlehy
By Parker & Carter
Attorneys

RAILROAD TRACK LINING MACHINE

Original Filed Jan. 10, 1952 3 Sheets-Sheet 2

Inventor
Frank J. Herlehy
by Parker & Carter
Attorneys

Nov. 11, 1958 F. J. HERLEHY Re. 24,564

RAILROAD TRACK LINING MACHINE

Original Filed Jan. 10, 1952 3 Sheets-Sheet 3

Inventor
Frank J. Herlehy
by Parker & Carter
Attorneys

United States Patent Office

Re. 24,564
Reissued Nov. 11, 1958

24,564

RAILROAD TRACK LINING MACHINE

Frank J. Herlehy, Watertown, Wis.

Original No. 2,693,769, dated November 9, 1954, Serial No. 265,741, January 10, 1952. Application for reissue May 21, 1956, Serial No. 586,338

13 Claims. (Cl. 104—8)

Matter enclosed in heavy brackets [ ] appears in the original patent but forms no part of this reissue specification; matter printed in italics indicates the additions made by reissue.

My invention relates to an improvement in railroad track lining machines and has for one purpose to provide such a machine which, while supported on the rails of a track, can be employed to impart a bodily lateral movement of the track.

Another purpose is to provide such a machine which, while it is self-supported on the ballast, for example in the inter-tie spaces, may be employed bodily to move the ties and rails together, to the right or to the left.

Another purpose is to provide such a device in which the weight of the rails and ties is so far relieved that the track pressure upon the ballast is insufficient to prevent bodily lateral movement of the track.

*Another purpose is a new and improved method of aligning track.*

Another purpose is to provide a track lining assembly which may be effectively employed to impart to the track sufficient lateral movement to line it with desired accuracy along a predetermined track alignment.

Other purposes will appear from time to time in the course of the specification and claims.

I illustrate the invention more or less diagrammatically in the accompanying drawings, wherein.

Like parts are indicated by like symbols throughout the specification and drawings.

Figure 1:
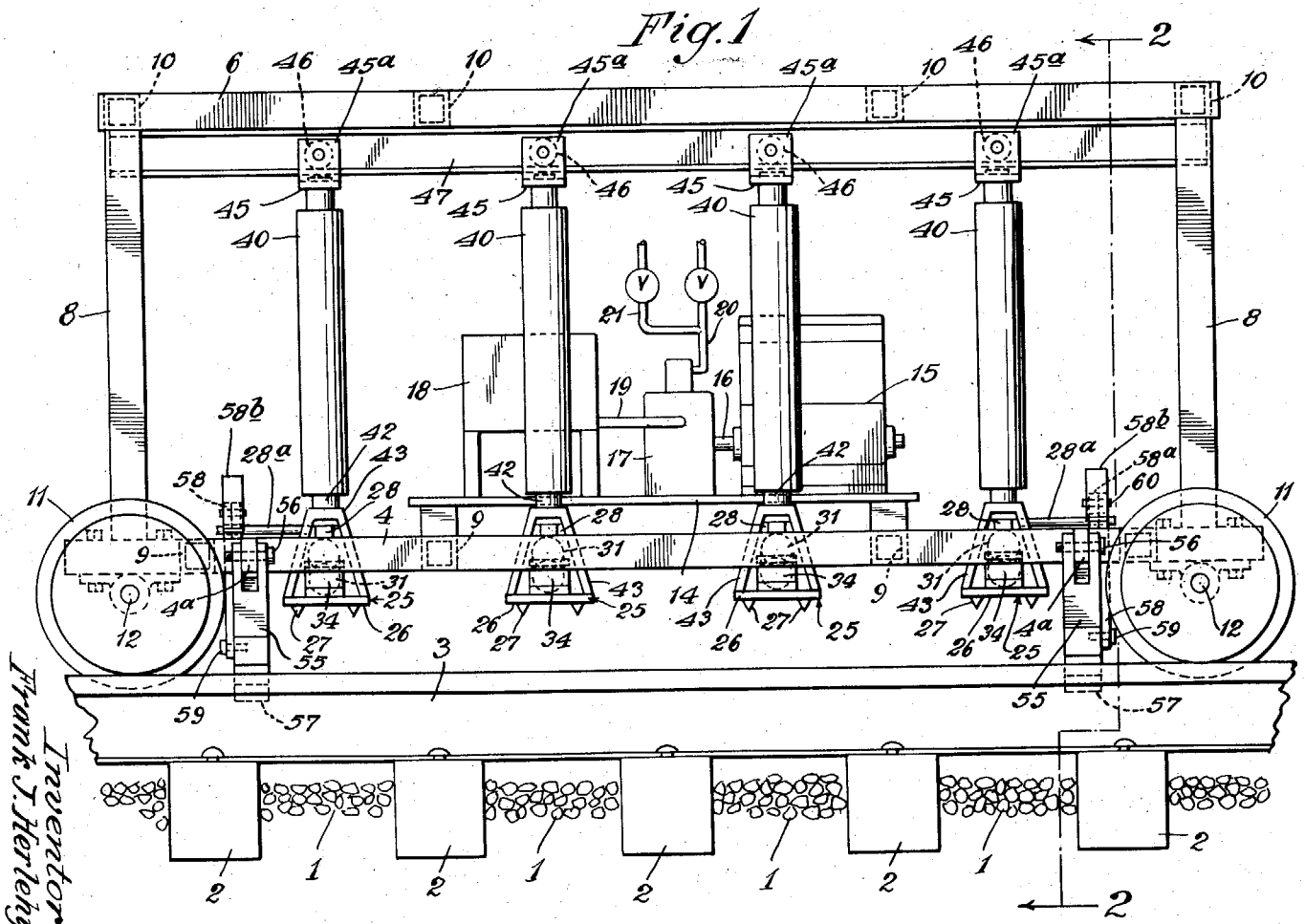
Figure 1 is a side elevation.

Referring to the drawings, 1 generally indicates the ballast of a track. Ties are indicated as at 2. 3, 3 indicate rails spiked or otherwise suitably connected to the ties, it being understood that I intend to illustrate a complete track in the sense that the rails are secured to the ties and that the ties are normally resting on the ballast.

I illustrate herein a vehicle which includes longitudinally extending bottom frame members 4, 5, longidinally extending top frame members 6, 7, vertical side members 8, horizontal transverse bottom members 9, and horizontal transverse top members 10. In effect, I thus provide an open frame or cage which is supported on any suitable rail engaging flanged wheels 11 on axles 12. Thus the vehicle, as a whole, is guided and supported on the rails and may be moved along the rails.

14 is any suitable intermediate platform upon which I may position any suitable motor 15 which, through a shaft 16, may drive any suitable pump or compressor 17 of a fluid system. 18 is any suitable reservoir of such system, connected to the pump for example by the duct or pipe 19. 20 is a duct or pipe extending from the opposite side of the pump or compressor. It is shown as branched as at 21. Thus I may provide any suitable source of fluid, preferably liquid, pressure for the actuation of below-described hydraulic rams.

A plurality of ballast engaging shoes are indicated as at 25. I illustrate four of these shoes, but any suitable number, greater or less, may be employed. Each such shoe is shown as having a generally plane bottom surface 26, from which downwardly extend a plurality of teeth or pins 27. 28 is a suitable central upward extension having ears 29 to which are pivoted, as at 30, hydraulic cylinders 31. Each such cylinder has therein a piston 32 from which extends a piston rod 33 to the outer end of which is mounted a fitting 34 having a lower flange 34a, which is relatively short, and a relatively long upper flange 34b, adapted to overlie the upper inner edge of the inner web of the track rails 3.

I may employ any suitable connections between the pressure delivery side of the pump or compressor 17 and the interior of the cylinder 31. I illustrate for example flexible pressure ducts 35 in connection with one side of the pistons 32 and flexible pressure ducts 36 in connection with the opposite side of the pistons 32. Thus when pressure is admitted through the ducts 35, the fittings 34 are moved outwardly against or toward the rails, whereas when pressure is admitted through the ducts 36, the pistons and thus the fittings 34 are withdrawn toward the inner-rail space.

Figure 3:
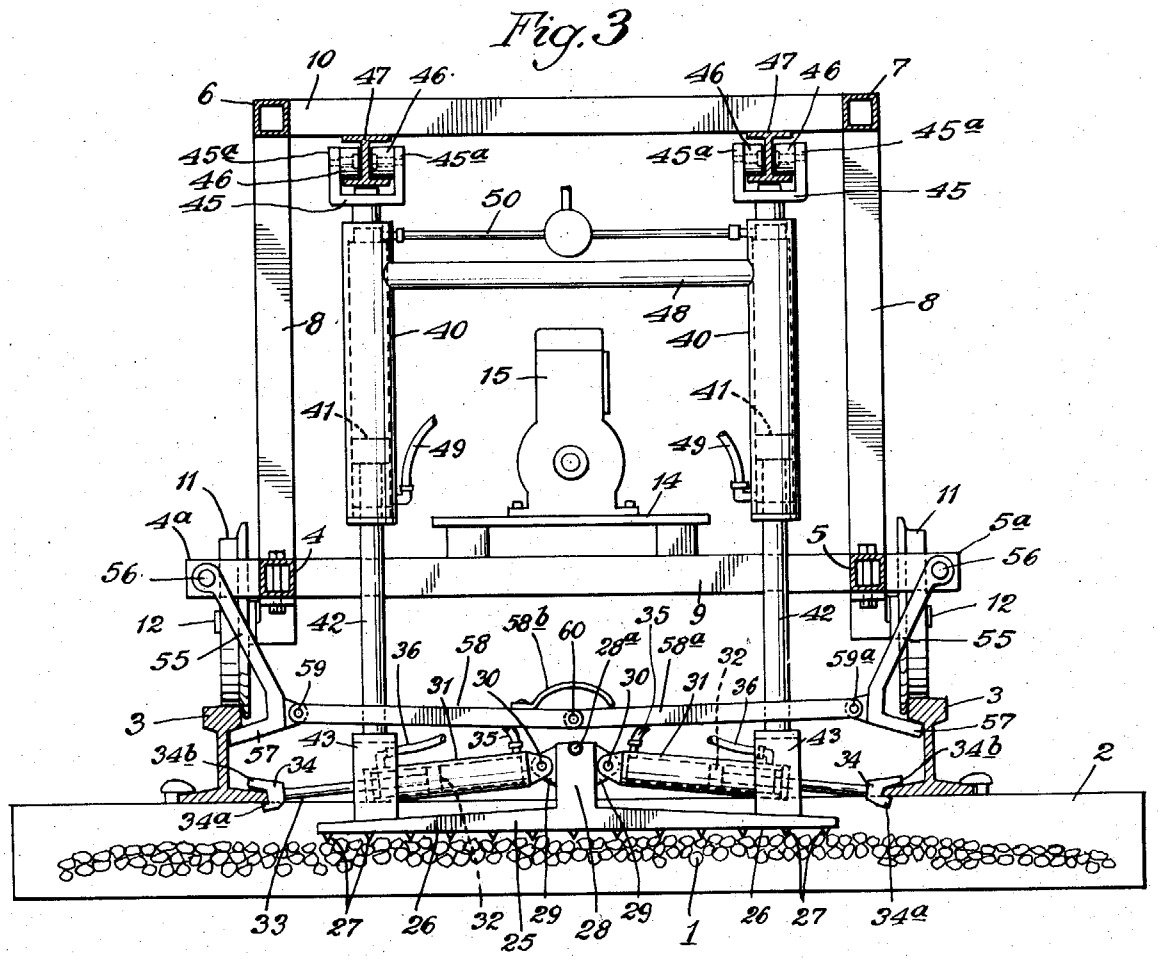
Figure 3 is a section similar to Figure 2 with parts in different position.

In Figure 1, I illustrate the shoes 25 as upwardly withdrawn, whereas in Figure 3, the shoes are in engagement with the ballast in the inter-tie spaces. In order to raise and lower the shoes, I illustrate cylinders 40 within which are pistons 41, from which extend piston rods 42, which are connected at their lower ends to the shoes 25 by the forked elements 43. It will be noted that these forked elements 43 have side portions which extend to the shoes 25 at opposite sides of the cylinder 32, which they tend to guide and protect. The cylinders 40 are secured at their upper ends to supporting forks 45. These have upper side members 45a which carry rollers 46. These rollers ride along the opposite flanges of any suitable I beams 47. As a matter of convenience or of reinforcement, corresponding cylinders 40, at opposite sides of the device, may be connected by any suitable cross pieces 48. 49 indicates pressure ducts extending to the interior of the cylinders 40 below the pistons 41, and 50 indicates pressure ducts or pipes extending to the interiors of the cylinders 40 above the piston 41. It will be understood that the operator, by admitting pressure through the pipes 50, can force the pistons 41 downward. The result is eventually to position the shoes 25, as shown in Figure 3, against the ballast in the inter-tie spaces. Preferably, I provide sufficient pressure so that, without positively elevating the ties or rails of the vehicle itself, the effective weight of the ties and rails is so far reduced that bodily movement of the ties and rails becomes within the power of the hydraulic rams which include the cylinders 31. In normal operation the track is not actually lifted and for this reason the ballast will not run or roll under the ties and disturb the supporting surface of the ballast.

In order to lock the vehicle upon the rails, I employ hooks 55 which are pivoted, as at 56, to lugs 4a, 5a extending from the bottom frame members 4 and 5 respectively. Preferably, the centers 56 are slightly exterior to the centers of the rails, as is shown in Figure 3. Each such hook 55 has a bottom outwardly extending tooth or end portion 57, which is adapted to underlie the top flange or head of the rail, as shown in Figure 3. In order to hold the portion 57 in locking position, I provide a brake, joint or toggle, including links 58 and 58a. The outer end of each link is pivoted to a hook or hooks, as at 59 or 59a. They are pivoted to each other as at 60, the parts being so proportioned in the relation of centers that when the links 58 and 58a drop by gravity into the position in which they are shown in Figure 3, they constitute a link which provides holding the teeth or ends 57 under the rails. Thus when pressure is admitted through the pipes 50 and the vehicle or frame is upwardly urged, the teeth or ends 57 operate in effect to tend to raise the rails and with them the ties. While they are not actually lifted, their effective weight as applied to the ballast is substantially reduced, to any desired degree, thus rendering the track as a whole more readily movable. Whereas under normal circumstances it is not necessary actually to elevate the track, it is within my invention to cause or permit actual lifting of the track upwardly by hydraulic pressure exerted by means of the rams which include the cylinders 40. In some circumstances, as for example in the case of old track, a slight lift of the ties may be necessary to separate the ballast from the ties before shifting the track laterally.

Assume that the parts are in the position in which they are shown in Figure 3, with the hooks 57 taking a substantial part of the weight of the track, then the operator, by admitting pressure behind the pistons 32 of the cylinders 31 along one side of the vehicle, may force the track laterally. Assume that the pressure is admitted behind the pistons 32 of the left-hand set of hydraulic rams or cylinders 31, referring to the position of the parts as shown in Figure 3, the track may be bodily moved slightly to the left. The admission of pressure behind the pistons in the right-hand set will have the opposite effect. As will be seen in Fig. 2, there is sufficient clearance between the rollers 46 and the I-beams 47 to allow the motors 40 to tilt relative to the base during the shifting operation. Only a slight degree of such relative movement is necessary. Since the details of the hydraulic system of ducts, valves, etc. do not of themselves form part of the present invention, they are illustrated only diagrammatically. It will be understood, of course, that any suitable valve or control means may be employed for admitting pressure where desired and for relief pressure where necessary.

Figure 2:
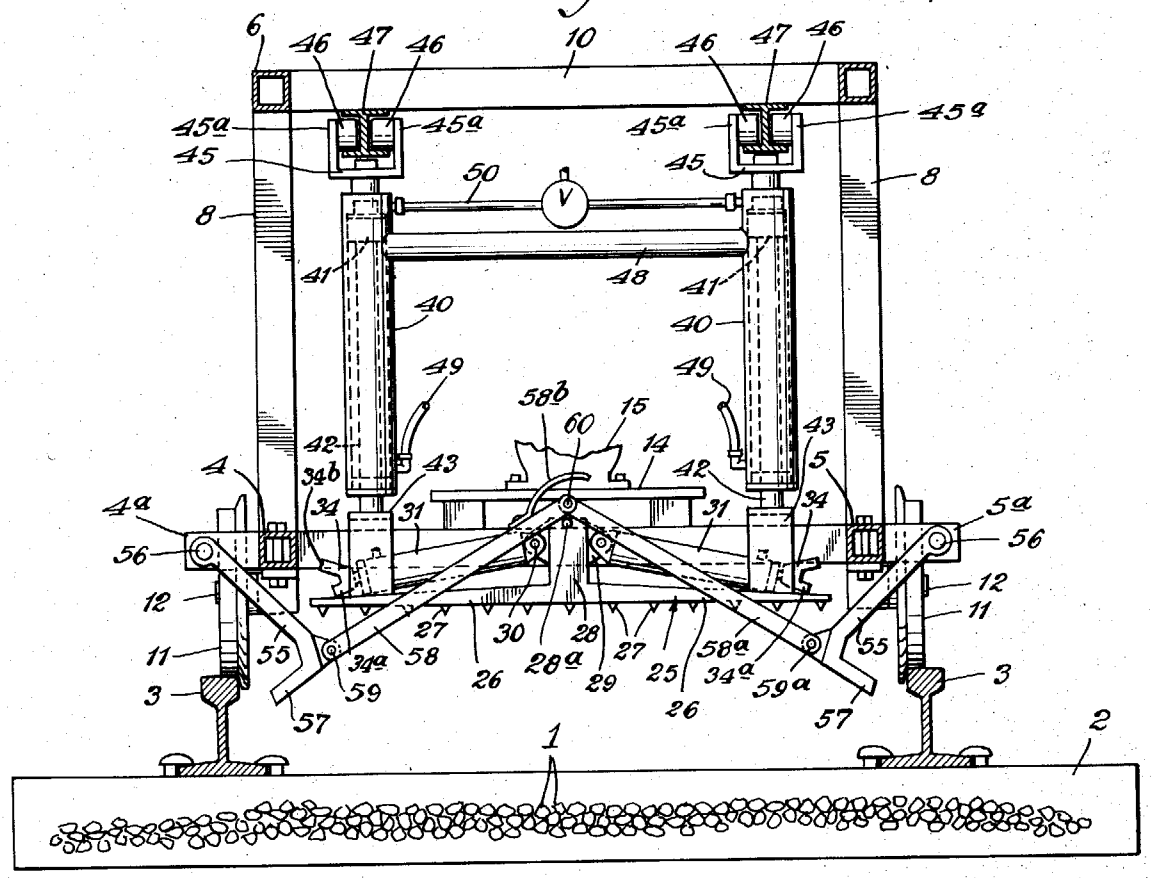
Figure 2 is a section on the line 2—2 of Figure 1.

In moving the device from the operative position in which it is shown in Figure 3, it will be understood that pressure is released from the hydraulic rams 31 to the degree necessary to free the fittings 34 for upward movement. It will be noted that the lower flanges 34a are shown as substantially shorter than the upper flanges 34b. Thus a relatively small inward movement of the pistons is sufficient to release the fittings from the lower flange of the rails. When pressure is admitted below the pistons 41 of the hydraulic rams or cylinders 40, the shoes 25 are bodily lifted. The actuating rod 28a on the portion 28 breaks the toggle joint, as shown in Figures 1 and 2, and causes an inward withdrawal of the teeth or ends 57 of the hooks 55. In the withdrawn position of the pistons 32, the rams or cylinders 31 rest on the upper surface of the shoes 25 and are held against side stress by lying within the fork 43. The limit member 58b, as shown in Figure 3, limits the downward movement of the toggle joint formed by the links 58 and 58a, and thus inhibits the upward breaking of the joint. In order positively to lift the toggle joints, the intermediate members 28 of the end shoes 26 are provided with extensions or bars 28a. One of these is shown at each end of the vehicle, as illustrated in Figure 1, as only two of the toggles need be employed. As will be clear from Figure 1, there may be two of the hooks 55 at each side of the vehicle, these being located adjacent but within the flanged wheels 11.

It will be realized that whereas I have described and claimed a practical and operative device, nevertheless many changes may be made in size, shape, number and disposition of parts without departing from the spirit of my invention. I therefore wish my description and drawings to be taken as in a broad sense illustrative or diagrammatic rather than as limiting me to my specific disclosure herein. In particular, it will be understood that any suitable power application means may be employed, although I find a conventional hydraulic system of rams practical and satisfactory.

The use and operation of my invention are as follows:

I provide a vehicle which may be conveyed along the rails of a track upon its own wheels. I illustrate for example the flanged wheels 11 which are advantageously of somewhat less thickness along their axles than conventional railroad wheels. As shown in Figure 2, they are of substantially half width. Riding on these wheels, the vehicle, with its working parts upwardly withdrawn, can form part of a train or may be moved by any suitable means. I may for example provide a drive connection operated by the motor 15. When the vehicle is at the point where work is to be done, the operator positions it, or leaves it in position, and applies fluid pressure to drop the shoes 25 toward the ballast engaging position in which they are shown in Figure 3. The fittings 34 are all at the same time forced outwardly far enough to drop the upper flange 34b upon the bottom rail flange. The toggle and joint formed of links 58 and 58a, being free from the supporting effect of the pins 28a, drop by gravity into the position in which they are shown in Figure 3, with the stop 58b permitting the center to drop slightly below alignment between the centers 59 and 59a. The ends 57 of the hooks 55 are locked beneath the heads of the rails.

Sufficient pressure is supplied above the pistons 41 to relieve the track weight to the desired degree. The operator can then move the track at will laterally by controlling and varying the pressures within the horizontal rams 31. When the track has been moved to the desired degree, the process is reversed and the parts are upwardly withdrawn to the positton in which they are shown in Figures 1 and 2.

I claim:

1. In a track lining machine, a base mounted for movement along the rails of a track, locking elements at opposite sides of said base, adapted to prevent elevation of the base from the track, and means for moving them into and out of locking engagement with the rails of the track, a ballast engaging element movably mounted on the base, and means for moving it into and out of contact with the ballast of the track, in an inter-tie space, side thrust members mounted on the ballast engaging element and extensible thence against each rail, and means for urging them selectively against one of the rails.

2. The structure of claim 1, characterized by and including motor means on the base, and a pump driven thereby, the actuating means for the ballast engaging element, and the side thrust members including hydraulic rams, and ducts connecting said hydraulic rams to said pump.

3. In a track lining member, a base mounted for movement along the rails of a track, track locking means for locking said base against upward movement from said track, a ballast engaging element movably mounted on the base, and means for thrusting it downwardly against the ballast and for thereby, through the base, directing an upward thrust against the track, and means supported by said base and operable between said element and said rails for directing a lateral thrust against either rail of the track during the exertion of said upward thrust.

4. The structure of claim 3, characterized by and including hydraulic rams on the ballast engaging element, each said ram including a rail contacting element.

5. In a track lining machine, a base mounted for movement along the rails of a track, track locking means for locking said base against upward movement from said track, a plurality of ballast engaging elements movably mounted on the base, means for thrusting them downwardly against the ballast and for thereby, through the base, directing an upwardly thrust against the track, and means supported by said base and operable between said elements and said rails for directing a lateral thrust against either rail of the track during the exertion of said upward thrust.

6. The structure of claim 5, characterized by and including a plurality of hydraulic rams on each ballast engaging element, each such ram having a movable portion connectable with one rail of the track.

7. The structure of claim 3, characterized by and including means for actuating the track locking means in response to downward movement of the ballast engaging element.

8. The structure of claim 5, characterized by and including means for actuating the thrust locking means in timed relation to the movement of the ballast engaging elements downwardly against the ballast.

9. In a track lining machine, a base mounted for movement along the rails of a track, means for locking the base against upward movement from the track, a plurality of ballast engaging elements longitudinally adjustable along said base, means for thrusting them downwardly against the ballast and for thereby imparting an upward thrust against the track when the track is locked to the base, and means supported by said base and operable between said elements and said rails for selectively directing a lateral thrust against either rail of the track during the maintenance of an upward thrust against the track.

10. In a track lining machine, a base movable along the rails of a track, rail engaging flanged supporting wheels rotatably mounted on the base, locking elements movably mounted at opposite sides of the base, each said element including a portion adapted, when extending outwardly under the inner side of the head flange of a track rail, to lock the base against upward movement from said rail, means for moving said locking elements into and out of locking position, one or more ballast engaging elements movably mounted on the base and means for moving them into and out of contact with the ballast of the track in an inter-tie space or spaces, and side thrust members movably mounted on the ballast engaging elements and including portions extensible against each said rail, and means for selectively urging said side thrust members against one or the other of the track rails on which the lining machine is mounted.

11. The structure of claim 10, characterized by and including a platform mounted on the base, a motor on the platform, a pump on the platform, a driving connection between the pump and the motor, hydraulic elevators mounted on the ballast engaging elements and extending between said ballast engaging elements and the base, hydraulic rams mounted on the ballast engaging elements and extending to the side thrust members, and hydraulic connecting ducts between said pump and said hydraulic elevators and rams.

12. In a track lining machine, a base mounted for movement along the rails of a track, track locking means on said base for locking said base against upward movement from said track to thereby form a generally unitary structure of said track and said base, a ballast-engaging element movably mounted on the base, and means for thrusting said element downwardly against the ballast with sufficient force to remove substantially the entire weight of said structure from the ballast, and extensible means supported by said base and operable between said element and said structure for directing a lateral thrust against said structure with sufficient force to shift said structure laterally during the exertion of said upward thrust.

*13. A method of lining track, including rails and ties, on ballast, by the use of a vehicle adapted to be moved along the track; including the steps of releasably interlocking the track and vehicle so that the weight of a localized longitudinal section of track on each side of the vehicle will be added to the weight of the vehicle, directing an upward thrust against the track by interposing a generally vertical force between the vehicle and the ballast, applying the generally vertical force to the ballast in a selected area between the ties, developing the vertical force to a magnitude just sufficient to relieve the combined weight of the vehicle and the localized longitudinal section of track on each side of it from the ballast under the ties and at the same time to transfer their combined weight to the ballast at the selected area between the ties, thereby floating both the vehicle and the localized longitudinal section of track on each side of it relative to the ballast, and at the same time breaking any interlock between the ties and ballast due to the accumulation of foreign matter or otherwise, thereafter separately applying a lateral thrust against the track by interposing a generally horizontal force between the track and the vehicle applied generally at the selected area of application of the vertical force to the ballast between the ties while, at the same time, maintaining the upward thrust so that during the application of the lateral thrust, the combined weight of the vehicle and the localized longitudinal section of track on each side of it will prevent slippage of the upward thrust applied to the ballast at the selected area between the ties, thereby causing the track to be shifted laterally in response to the lateral thrust without affecting the upward thrust appreciably.*

References Cited in the file of this patent or the original patent

UNITED STATES PATENTS

| | | |
|---|---|---|
| 748,311 | Roth | Dec. 29, 1903 |
| 757,902 | Fischer | Apr. 19, 1904 |
| 978,858 | Devitt | Dec. 20, 1910 |
| 1,131,018 | Troutman | Mar. 9, 1915 |
| 1,264,376 | De Vey et al. | Apr. 30, 1918 |
| 1,458,402 | Forsberg | June 12, 1923 |
| 1,784,963 | Holt et al. | Dec. 16, 1930 |
| 1,977,276 | Holt et al. | Oct. 16, 1934 |
| 2,050,179 | Holt et al. | Aug. 4, 1936 |

FOREIGN PATENTS

| | | |
|---|---|---|
| 674,783 | France | Feb. 1, 1930 |